(12) United States Patent

Spiegel et al.

(10) Patent No.: US 12,681,211 B2

(45) Date of Patent: Jul. 14, 2026

(54) OPTICAL ARTICLE WITH REDUCED VISUAL FATIGUE

(71) Applicant: ESSILOR INTERNATIONAL, Charenton-Le-Pont (FR)

(72) Inventors: Daniel Spiegel, Singapour (SG); Yi Gao, Singapour (SG); Björn Drobe, Singapour (SG); Xingzhao Ding, Singapour (SG)

(73) Assignee: Essilor International, Charenton-le-Pont (FR)

( * ) Notice: Subject to any disclaimer, the term of this patent is extended or adjusted under 35 U.S.C. 154(b) by 288 days.

(21) Appl. No.: 18/518,358

(22) Filed: Nov. 22, 2023

(65) Prior Publication Data

US 2024/0192406 A1 Jun. 13, 2024

(30) Foreign Application Priority Data

Dec. 7, 2022 (EP) ..................................... 22306814

(51) Int. Cl.
G02B 1/11 (2015.01)
G02C 7/10 (2006.01)

(52) U.S. Cl.
CPC ................ G02B 1/11 (2013.01); G02C 7/104 (2013.01)

(58) Field of Classification Search
CPC ... G02B 1/11; G02B 1/00; G02B 1/10; G02B 1/113; G02B 5/08; G02B 5/0816; G02B 5/0825; G02B 5/0833; G02B 5/20; G02B 5/28; G02B 5/285; G02C 7/104; G02C 7/00; G02C 7/02; G02C 7/022; G02C 7/10

USPC ....... 359/601, 577, 580, 581, 583, 584, 586, 359/588, 589, 590, 602, 603, 609, 613, 359/642, 722, 723, 738, 838, 839; 351/41, 44, 159.01, 159.6, 159.62, 159.65
See application file for complete search history.

(56) References Cited

U.S. PATENT DOCUMENTS

| | | | | |
|---|---|---|---|---|
| 10,481,413 | B2 * | 11/2019 | Höfener | G02B 1/116 |
| 2023/0176255 | A1 * | 6/2023 | Bolshakov | G02B 1/115 359/350 |
| 2024/0230957 | A1 * | 7/2024 | Ding | G02C 7/108 |
| 2024/0255779 | A1 * | 8/2024 | Ding | G02C 7/107 |

FOREIGN PATENT DOCUMENTS

| | | | | |
|---|---|---|---|---|
| CN | 109791219 A | * | 5/2019 | G02B 1/11 |

* cited by examiner

*Primary Examiner* — Arnel C Lavarias

(74) *Attorney, Agent, or Firm* — NIXON & VANDERHYE

(57) ABSTRACT

An optical article includes a front face adapted to receive incident optical beams and a back face through which transmitted optical beams exit to reach an eye, wherein the front face includes an interferential multilayer coating including a stack of dielectric layers. The interferential multilayer coating provides the optical article with a mean visible light reflection factor Rv that is lower than or equal to 2.0% over a range of angle of incidence included between 0 and 20 degrees, and that is higher than or equal to 2.0% over a range of angle of incidence included between 40 degrees and 60 degrees, the optical article having a higher mean visible light transmittance for low incidence angles and a lower mean visible light transmittance for high incidence angles.

20 Claims, 4 Drawing Sheets

| SiO2 | 71.9 nm |
|------|---------|
| SnO2 | 6.5 nm |
| ZrO2 | 73.4 nm |
| SiO2 | 140.8 nm |
| ZrO2 | 113.3 nm |
| HC | |

AR2

| SiO2 | 70.1 |
|------|------|
| SnO2 | 6.5 |
| ZrO2 | 76.8 |
| SiO2 | 144.7 |
| ZrO2 | 116.8 |
| HC | |

AR3

| SiO2 | 78.9 |
|------|------|
| SnO2 | 6.5 |
| SiO2 | 19.3 |
| ZrO2 | 37.4 |
| SiO2 | 341.2 |
| ZrO2 | 124.4 |
| HC | |

AR4

| SiO2 | 84.0 |
|------|------|
| ZrO2 | 117.0 |
| SiO2 | 179.3 |
| ZrO2 | 109.8 |
| SiO2 | 205.9 |
| ZrO2 | 16.6 |
| HC | |

OPTICAL ARTICLE WITH REDUCED VISUAL FATIGUE

CROSS-REFERENCE TO RELATED APPLICATIONS

This application claims the priority under 35 USC 119(a) of EP patent application 22306814.9 filed on Dec. 8, 2022, the entirety of which is incorporated herein by reference.

BACKGROUND OF THE INVENTION

Field of the Invention

The invention relates to an optical article providing increased visual comfort or reduced visual fatigue in particular when viewing digital screens.

Description of the Related Art

The intensive usage of digital devices brings along many challenges to the visual system of a subject and often results in digital eye strain or visual fatigue.

Critical Flicker Fusion (CFF) Frequency is the lowest temporal frequency at which an individual perceives a flickering light source as constant light. It varies with environment conditions, viewing distance, light spectrum, and the status of the viewer. CFF is widely used as a parameter for evaluating visual fatigue because it facilitates easy physical visual fatigue measurement. Many recent studies have been conducted to measure visual fatigue using CFF values. These studies focus on various parameters including the influence of ambient illuminance and light sources on CFF, visual fatigue depending on the type of reading device used, visual fatigue reduction techniques, main causes of visual fatigue, visual fatigue due to long-term computer work, visual distance and subject age.

While multifactorial in nature, one of the key contributors to visual discomfort and visual fatigue is a strong brightness imbalance between the digital screen and the background. This situation occurs for example when users are viewing bright cell phone screens in the darkness or using computer screens against strong backlight from the window. The automatic screen brightness adjusting algorithms on the cellphones or other digital display devices have their limits on luminance range and are not sensitive enough for quick adjustment.

Normal tinted lenses can decrease the overall amount of light entering the eye, but do not address the difference in luminance between screens and background.

Ophthalmic lenses with variable transmission, e.g., lenses with a gradient tint, are known for decades. For example, a gradient tinted lens has a darker tint in the upper lens part and a lighter tint in the lower lens part. Considering the luminance contrast between the digital screen and the background as a contributor to digital eye strain (for example, a computer screen in front of a window), these gradient tinted lenses emerge as an ideal candidate for relieving its symptoms. However, they are not widely used for this purpose, for at least two reasons. First, the transmission gradient of a gradient tinted lens is often not tailored for the specific purpose of viewing digital screens, and second, some people consider that they are unsightly.

SUMMARY OF THE INVENTION

Therefore, one object of the invention is to provide an optical article preventing or reducing visual fatigue, in particular when the user is viewing a digital screen against a strong backlight environment.

This invention proposes a number of solutions to reduce the glare in the peripheral vision to preserve central vision and maximize visual comfort.

The above objects are achieved according to the invention by providing an optical article comprising a front face adapted to receive incident optical beams and a back face through which transmitted optical beams exit to reach an eye of an individual, wherein the front face comprises an interferential multilayer coating comprising a stack of dielectric layers, the interferential multilayer coating providing the optical article with a mean visible light reflection factor Rv that is a function of the angle of incidence of each optical beam on the front face, said optical article being designed such that it has a higher mean visible light transmittance Tv for low incidence angles and a lower mean visible light transmittance Tv for high incidence angles, the mean visible light reflection factor (Rv) being lower than or equal to 2.0% for incident optical beams on the front face over a range of angle of incidence with respect to a perpendicular to said front face higher than or equal to 0 degrees and lower than or equal to 20 degrees, and the mean visible light reflection factor being higher than or equal to 2.0% for incident optical beams on the front face over a range of angle of incidence with respect to a perpendicular to said front face higher than or equal to 40 degrees and lower than or equal to 60 degrees.

The optical article is designed such that it has a lower mean visible light reflection factor (Rv) for low incidence angles and a higher mean visible light reflection factor (Rv) for high incidence angles. The level of mean visible light reflection factor (Rv) for low and high incidence angles can be personalized depending on the usage conditions such as: viewing distance, level of background light, ratio of brightness imbalance between digital screen and background light, angular size of the digital screen or depending on the behavior of the user among head mover and eye mover type.

According to a particular embodiment, the mean visible light reflection factor is lower than or equal to 8.0% for incident optical beams on the front face over a range of angle of incidence with respect to a perpendicular to said front face higher than or equal to 40 degrees and lower than or equal to 60 degrees.

According to another particular embodiment, the mean visible light reflection factor is higher than or equal to 2.5% and lower than or equal to 11.5% for incident optical beams on the front face over a range of angle of incidence with respect to a perpendicular to said front face higher than or equal to 40 degrees and lower than or equal to 60 degrees.

According to still another particular embodiment, the mean visible light reflection factor is higher than or equal to 3.5% and lower than or equal to 14.0% for incident optical beams on the front face over a range of angle of incidence with respect to a perpendicular to said front face higher than or equal to 40 degrees and lower than or equal to 60 degrees.

According to still another particular embodiment, the mean visible light reflection factor is higher than or equal to 4.5% and lower than or equal to 16.0% for incident optical beams on the front face over a range of angle of incidence with respect to a perpendicular to said front face higher than or equal to 40 degrees and lower than or equal to 60 degrees.

According to a particular and advantageous aspect, a ratio between Rvmin(40°) and Rv(0°) is higher than 3, preferably higher than 4, more preferably higher than 5, wherein Rvmin(40°) is the minimum Rv value at an angle of incidence with respect to a perpendicular to said front face that is equal to 40 degrees and Rv(0°) is the Rv value at an angle of incidence perpendicular to said front face.

According to an aspect of the present disclosure, the interferential multilayer coating comprises at least one layer of high refractive index material having a refractive index higher than 1.55 and at least one layer of low refractive index material having a refractive index of 1.55 or less.

Advantageously, said high refractive index material is selected among ZrO2, SnO2, SiN, TiO2, PrTiO3, LaTiO3, Ta2O5, Y2O3, Ce2O3, La2O3, Dy2O5, Nb2O5, HfO2, Sc2O3, Pr2O3, Al2O3, or Si3N4 and said low refractive index material is selected among SiO2, MgF2, ZrF4, Al2O3, AlF3, chiolite Na3[Al3F14], cryolite Na3[AlF6], or any mixture thereof, preferably SiO2 or SiO2 doped with Al2O3 with from 1 to 10% by weight, more preferably from 1 to 8% by weight of Al2O3 relative to the total weight of SiO2 and Al2O3 in said low refractive index material layer.

According to various examples, said interferential multilayer coating comprises layers of different materials from an innermost layer to an outermost layer:

a layer of zirconium dioxide having a thickness of 15-130 nm;

a layer of silicon dioxide having a thickness of 130-300 nm, preferably of 130-250 nm;

a layer of zirconium dioxide having a thickness of 30-130 nm;

a layer of tin oxide having a thickness of 5-30 nm;

an outermost layer comprising a layer of silicon dioxide having a thickness of 5-130 nm.

Advantageously, the optical article further comprises a hard coating, the interferential multilayer coating being arranged on said hard coating.

The invention also concerns an ophthalmic equipment comprising a frame and at least one ophthalmic lens according to the present disclosure, mounted on the frame.

Advantageously, the ophthalmic equipment comprises another ophthalmic lens according to the present disclosure, mounted on the frame.

The following description with reference to the accompanying drawings will make it clear what the invention consists of and how it can be achieved. The invention is not limited to the embodiment/s illustrated in the drawings. Accordingly, it should be understood that where features mentioned in the claims are followed by reference signs, such signs are included solely for the purpose of enhancing the intelligibility of the claims and are in no way limiting on the scope of the claims.

DETAILED DESCRIPTION

In the description which follows the drawings are not necessary to scale and certain features may be shown in generalized or schematic form in the interest of clarity and conciseness or for informational purposes. In addition, although making and using various embodiments are discussed in detail below, it should be appreciated that as described herein are provided many inventive concepts that may be embodied in a wide variety of contexts. Embodiments discussed herein are merely representative and do not limit the scope of the invention. It will also be obvious to one skilled in the art that all the technical features that are defined relative to a process can be transposed, individually or in combination, to a device and conversely, all the technical features that are defined relative to a device can be transposed, individually or in combination, to a process.

Definitions

The mean visible light reflection factor Rv corresponds to the reflection coefficient integrated over the visible spectrum between 380 nm and 780 nm and weighted by the curve of energy sensitivity of the human eye for a CIE observer over the visible spectrum between 380 nm et 780 nm with a daylight illuminant. More precisely, the mean visible light reflection factor Rv is defined as follows:

$$R_v = \frac{\int_{380}^{780} R(\lambda)V(\lambda)D_{65}(\lambda)d\lambda}{\int_{380}^{780} V(\lambda)D_{65}(\lambda)d\lambda}$$

where R(λ) is the reflectance at a wavelength A between 380 nm and 780 nm, V(λ) is the eye sensitivity function for a photopic observer in the color space defined by the CIE (Commission on Illumination, in French "Commission Internationale de l'Eclairage") in 1931 and D65(λ) is the daylight illuminant defined in the CIE S005/E-1998 standard.

The mean visible light transmittance, denoted Tv, represents the transmission coefficient over the visible spectrum between 380 nm and 780 nm. When the optical article has no absorption, the total of transmission plus reflection always is 100% or, in other words, Tv=100%−Rv.

In general, the multilayer interferential coating used in the present disclosure involves dielectric layers having small thicknesses, and the absorption of the multilayer interferential coating is almost zero. Thus, values in transmittance are easily deduced from values in reflection. However, in some applications, the optical article comprises a tinted substrate or a tinted layer having a determined absorption. In this case, the sum of reflection and transmittance is not 100% due to this absorption. In the present application, the absorption of the optical article is assumed to be uniform across the surface area of said optical article.

Device

Figures 1, 2:
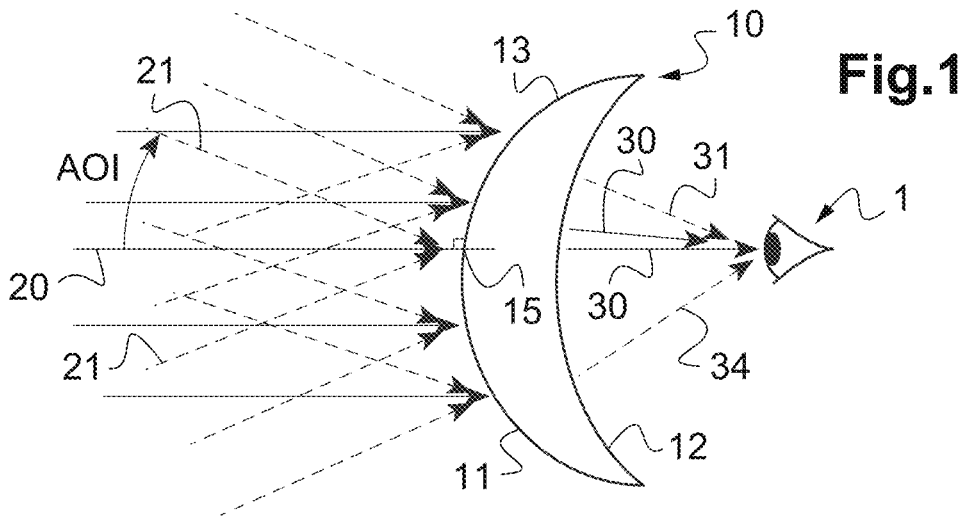
FIG. 1 schematically represents a side view of an optical article according to the present disclosure and the light beams incident on the front face at various angles of incidence.
FIG. 2 is a table showing the structure and composition of an exemplary interferential multilayer coating AR1 in an optical article according to the present disclosure.

FIG. 1 shows an exemplary optical article according to the present disclosure. The optical article 10 comprises a substrate.

The substrate may in particular be an optically transparent material having the shape of the optical article, for example an ophthalmic lens destined to be mounted in glasses. In this context, the term "substrate" is understood to mean the base constituent material of the optical lens and more particularly of the ophthalmic lens. This material acts as support for a stack of one or more coatings or layers.

The substrate may be made of mineral glass or organic glass, preferably organic glass. The organic glasses can be either thermoplastic materials such as polycarbonates and thermoplastic polyurethanes or thermosetting (cross-linked) materials such as diethylene glycol bis(allylcarbonate) polymers and copolymers (in particular CR-39® from PPG Industries), thermosetting polyurethanes, polythiourethanes, preferably polythiourethane resins having a refractive index of 1.60 or 1.67, polyepoxides, polyepisulfides, such as those having a refractive index of 1.74, poly(meth)acrylates (such as PMMA) and copolymers based substrates, such as substrates comprising (meth)acrylic polymers and copolymers derived from bisphenol-A, polythio(meth)acrylates, as well as copolymers thereof and blends thereof. Preferred materials for the lens substrate are polycarbonates (PC) and diethylene glycol bis(allylcarbonate) polymers, in particular substrates made of polycarbonate.

Specific examples of substrates suitable to the present invention are those obtained from thermosetting polythiourethane resins, which are marketed by the Mitsui Toatsu Chemicals company as MR series, in particular MR6®, MR7® and MR8® resins. These substrates as well as the monomers used for their preparation are especially described in the U.S. Pat. Nos. 4,689,387, 4,775,733, 5,059, 673, 5,087,758 and 5,191,055.

The interferential coating (antireflective or reflective coating) may be deposited directly onto a bare substrate. It is preferred usually that the main surface of the substrate be coated with one or more functional coatings improving its optical and/or mechanical properties, prior to depositing the reflective coating of the invention. These functional coatings traditionally used in optics may be, without limitation, an impact-resistant primer layer, an abrasion- and/or scratch-resistant coating (hard coat), a polarized coating, an antistatic coating, a photochromic coating, a tinted coating or a stack made of two or more of such coatings.

The impact-resistant primer coating which may be used in the present invention can be any coating typically used for improving impact resistance of a finished optical article. By definition, an impact-resistant primer coating is a coating which improves the impact resistance of the finished optical article as compared with the same optical article but without the impact-resistant primer coating.

Typical impact-resistant primer coatings are (meth)acrylic based coatings and polyurethane based coatings. In particular, the impact-resistant primer coating according to the invention can be made from a latex composition such as a poly(meth)acrylic latex, a polyurethane latex or a polyester latex.

Preferred primer compositions include compositions based on thermoplastic polyurethanes, such as those described in the patents JP 63-141001 and JP 63-87223, poly(meth)acrylic primer compositions, such as those described in the U.S. Pat. Nos. 5,015,523 and 6,503,631, compositions based on thermosetting polyurethanes, such as those described in the patent EP 0404111 and compositions based on poly(meth)acrylic latexes or polyurethane latexes, such as those described in the U.S. Pat. No. 5,316,791 and EP 0680492. Preferred primer compositions are compositions based on polyurethanes and compositions based on latexes, in particular polyurethane latexes, poly(meth) acrylic latexes and polyester latexes, as well as their combinations. In one embodiment, the impact-resistant primer comprises colloidal fillers.

Poly(meth)acrylic latexes are latexes based on copolymers essentially made of a (meth)acrylate, such as for example ethyl (meth)acrylate, butyl (meth)acrylate, methoxyethyl (meth)acrylate or ethoxyethyl (meth)acrylate, with at least one other co-monomer in a typically lower amount, such as for example styrene.

Commercially available primer compositions suitable for use in the invention include the Witcobond® 232, Witcobond® 234, Witcobond® 240, Witcobond® 242 compositions (marketed by BAXENDEN CHEMICALS), Neorez® R-962, Neorez® R-972, Neorez® R-986 and Neorez® R-9603 (marketed by ZENECA RESINS), and Neocryl® A-639 (marketed by DSM coating resins).

The thickness of the impact-resistant primer coating, after curing, typically ranges from 0.05 to 30 μm, preferably 0.2 to 20 μm and more particularly from 0.5 to 10 μm, and even better 0.6 to 5 μm or 0.6 to 3 μm, and most preferably 0.8 to 1.5 μm.

The impact-resistant primer coating is preferably in direct contact with an abrasion- and/or scratch-resistant coating.

The abrasion- and/or scratch-resistant coating may be any layer traditionally used as an anti-abrasion and/or anti-scratch coating in the field of optical lenses.

The abrasion- and/or scratch-resistant coatings are preferably hard coatings based on poly(meth)acrylates or silanes, generally comprising one or more mineral fillers intended to increase the hardness and/or the refractive index of the coating once cured.

Abrasion- and/or scratch-resistant coatings are preferably prepared from compositions comprising at least one alkoxysilane and/or a hydrolyzate thereof, obtained for example through hydrolysis with a hydrochloric acid solution and optionally condensation and/or curing catalysts.

Suitable coatings that are recommended for the present invention include coatings based on epoxysilanes and/or epoxysilanehydrolyzates such as those described in the patents EP 0614957, U.S. Pat. Nos. 4,211,823 and 5,015, 523.

A preferred abrasion- and/or scratch-resistant coating composition is disclosed in the patent EP 0614957, in the name of the applicant. It comprises a hydrolyzate of epoxy trialkoxysilane and dialkyl dialkoxysilane, colloidal silica and a catalytic amount of an aluminum-based curing catalyst such as aluminum acetylacetonate, the rest being essentially composed of solvents traditionally used for formulating such compositions. Preferably, the hydrolyzate used is a hydrolyzate of g-glycidoxypropyltrimethoxysilane (GLYMO) and dimethyldiethoxysilane (DMDES).

The abrasion- and/or scratch-resistant coating composition may be deposited by known methods and is then cured, preferably using heat or ultraviolet radiation. The thickness of the (cured) abrasion- and/or scratch-resistant coating does generally vary from 2 to 10 μm, preferably from 3 to 5 μm.

Prior to depositing the reflective coating or other functional coatings, the surface of the article is usually submitted to a physical or chemical surface activating and cleaning pre-treatment, so as to improve the adhesion of the layer to be deposited, such as disclosed in WO 2013/013929. This pre-treatment is generally performed on the surface of an abrasion- and/or scratch-resistant coating (hard coat).

This pre-treatment is generally carried out under vacuum. It may be a bombardment with energetic species, for example an ion beam bombardment ("Ion Pre-Cleaning" or "IPC") or an electron beam treatment, a corona treatment, an ion spallation treatment, an ultraviolet treatment or a plasma treatment under vacuum, using typically an oxygen or an argon plasma. It may also be an acid or a base surface treatment and/or a solvent surface treatment (using water or an organic solvent) with or without ultrasonic treatment. Many treatments may be combined. Thanks to these cleaning treatments, the cleanliness of the substrate surface is optimized.

By energetic species, it is meant species with an energy ranging from 1 to 300 eV, preferably from 10 to 150 eV, and more preferably from 10 to 150 eV and most preferably from 40 to 150 eV. Energetic species may be chemical species such as ions, radicals, or species such as photons or electrons.

The preferred pre-treatment is an ion bombardment, for example by using an ion gun-generated argon ion beam.

The optical article according to the invention may also comprise coatings formed on the reflective coating and capable of modifying the surface properties thereof, such as a hydrophobic and/or oleophobic coating (antifouling top coat). These coatings are preferably deposited onto the outer layer of the reflective coating. Generally, their thickness is lower than or equal to 10 nm, does preferably range from 1 to 10 nm, more preferably from 1 to 5 nm. Antifouling top coats are generally coatings of the fluorosilane or fluorosilazane type, preferably comprising fluoropolyether moieties and more preferably perfluoropolyether moieties. More detailed information on these coatings is disclosed in WO 2012076714.

Instead of a hydrophobic coating, a hydrophilic coating may be used which provides anti-fog properties (anti-fog coating), or a precursor of an anti-fog coating which provides anti-fog properties when associated with a surfactant. Examples of such anti-fog precursor coatings are described in the patent application WO 2011/080472.

The additional coatings such as primers, hard coats and antifouling top coats may be deposited onto a main face of the substrate using methods known in the art, including spin-coating, dip-coating, spray-coating, evaporation, sputtering, chemical vapor deposition and lamination.

Typically, an optical article according to the invention comprises a substrate that is successively coated with an impact-resistant primer layer, an anti-abrasion and/or scratch-resistant layer, an interferential coating according to the invention, and a hydrophobic and/or oleophobic coating, or a hydrophilic coating that provides anti-fog properties, or an anti-fog precursor coating.

The optical article 10 has a front face 11 intended to be exposed to incident light beams 20, 21 and a back face 12 intended to be placed in closer proximity to an eye 1 of an individual wearing said optical article 10. The back face 12 or rear face or inner face is opposite to the front face 11 or external face.

The substrate of the optical article 10 may be shaped as a concavo-convex lens as illustrated on FIG. 1 wherein the front face 11 is convex and the back face 12 is concave. Alternatively, the front face 11 and/or the back face 12 is/are flat.

For clarity of the present disclosure, we consider that the front face 11 is flat.

According to the present disclosure, the optical article 10 comprises an interferential multilayer coating 13 deposited on the front face 11 of the substrate. In the present disclosure, it is to be understood that a layer or a coating deposited on or onto a substrate is intended to mean that the layer or the coating is deposited onto the external surface of the outer coating of the article that is the coating which is the most distant from the substrate.

The interferential multilayer coating 13 may be deposited directly onto the substrate. Alternatively, at least one layer may be arranged between the substrate and the interferential multilayer coating 13, such as a hard coating, also known as an abrasion- and/or scratch resistant coating and denoted HC. The hard coating, HC, has an optical refractive index of about 1.5 to 1.6 or higher in the visible range.

The interferential multilayer coating 13 is deposited over the surface area of the front face 11. However, the surface area with the interferential multilayer coating 13 is not necessary the whole surface of the front side 11.

The interferential multilayer coating 13 comprises a stack of dielectric layers. The number of layers in the stack is comprised between two and ten and generally between four and six layers. Each layer of the stack and the stack itself has a uniform thickness over the surface area whereon it is deposited.

The front face 11 with the interferential multilayer coating 13 receives incoming light beams 20, 21 from various light sources or objects in the scene to be viewed by the user. In particular, the light beam 20 incident on the optical article 10 at point 15 in a central area of the optical article 10 has an angle of incidence close to 0 degree, whereas the light beam 21 incident at the same point 15 of the optical article 10 has a non-zero angle of incidence AOI ranging for example up to 60 degrees. The angle of incidence is defined as the angle of the incoming light beam relatively to the normal to the surface, here the front face 11. The angle of incidence is thus defined locally at each point on the optical article. The angle of incidence generally depends on the point whereon the light beam is incident on the front face, in particular for a curved front face 11. In the present description, the values of angle of incidence are expressed in absolute value and may correspond to positive or negative value relatively to a normal to the front face 11 in any plane of incidence.

The optical article 10 comprises an interferential multilayer coating 13 on the front face 11. As described in detail below, the interferential multilayer coating 13 reflects a part of the incoming light beams 20, 21 and transmits another part 30, 31 of the incoming light beams. More precisely, the interferential multilayer coating 13 is designed to provide a lower mean visible light reflection factor Rv for incident light beams with a low angle of incidence and a higher mean visible light reflection factor Rv for incident light beams with a high angle of incidence.

The conventional anti-reflection stack AR0 is designed to provide a low mean visible light reflection factor (Rv), that is almost independent of the angle of incidence of the incoming light beams. For example, as illustrated on FIG. 3, the conventional anti-reflection stack AR0 has a mean visible light reflection factor Rv that is about 1% at an angle of incidence comprised between 0 and 20 degrees to the normal to the surface, and that increases slowly while remaining lower than 2.5% when the angle of incidence increases from 20 degrees to 60 degrees.

In contrast, the exemplary first interferential multilayer coating AR1 has a mean visible light reflection factor Rv measured/calculated in % and rounded to two decimal places, as a function of the angle of incidence in degrees, as detailed in the following table:

TABLE 1

| mean visible light reflection factor $R_v$ as a function of the angle of incidence (AOI) for the first interferential multilayer coating AR1 | | | | | | | | | | | | |
|---|---|---|---|---|---|---|---|---|---|---|---|---|
| AOI | 0 | 5 | 10 | 15 | 20 | 25 | 30 | 35 | 40 | 45 | 50 | 55 | 60 |
| $R_v$ | 0.83 | 0.85 | 0.91 | 1.04 | 1.24 | 1.56 | 2.05 | 2.77 | 3.83 | 5.31 | 7.36 | 10.11 | 13.76 |

After transmission through the optical article 10 and thus through the interferential multilayer coating 13, the transmitted light beams 30, 31 are directed toward the eye 1 of a viewer. Schematically, the transmitted light beam 30 corresponds to an incident light beam with a low angle of incidence on the interferential multilayer coating 13 and the transmitted light beam 31 corresponds to an incident light beam with a high angle of incidence on the interferential multilayer coating 13. The optical article according to the present disclosure advantageously presents a higher transmittance for the incident light beam with a low angle of incidence and a lower transmittance for the incident light beam with a high angle of incidence. Thus, the viewer perceives the parts of the scene seen through the optical article in a central vision area around the viewing direction relatively brighter than parts of the scene corresponding to lateral or peripheral vision which are more attenuated by the interferential multilayer coating 13.

FIG. 2 shows the structure of a first example of an interferential multilayer coating AR1 deposited on a hard coating, HC, on the front face 11 of an optical article 10. The interferential multilayer coating AR1 comprises a stack of five layers, from the innermost to the outermost layer: a layer of zirconium dioxide (ZrO2) having a thickness of 113.3 nm, a layer of silicon dioxide (SiO2) having a thickness of 140.8 nm, a layer of zirconium dioxide (ZrO2) having a thickness of 73.4 nm, a layer of tin oxide (SnO2) having a thickness of 6.5 nm, and a layer of silicon dioxide (SiO2) having a thickness of 71.9 nm.

Figure 3:
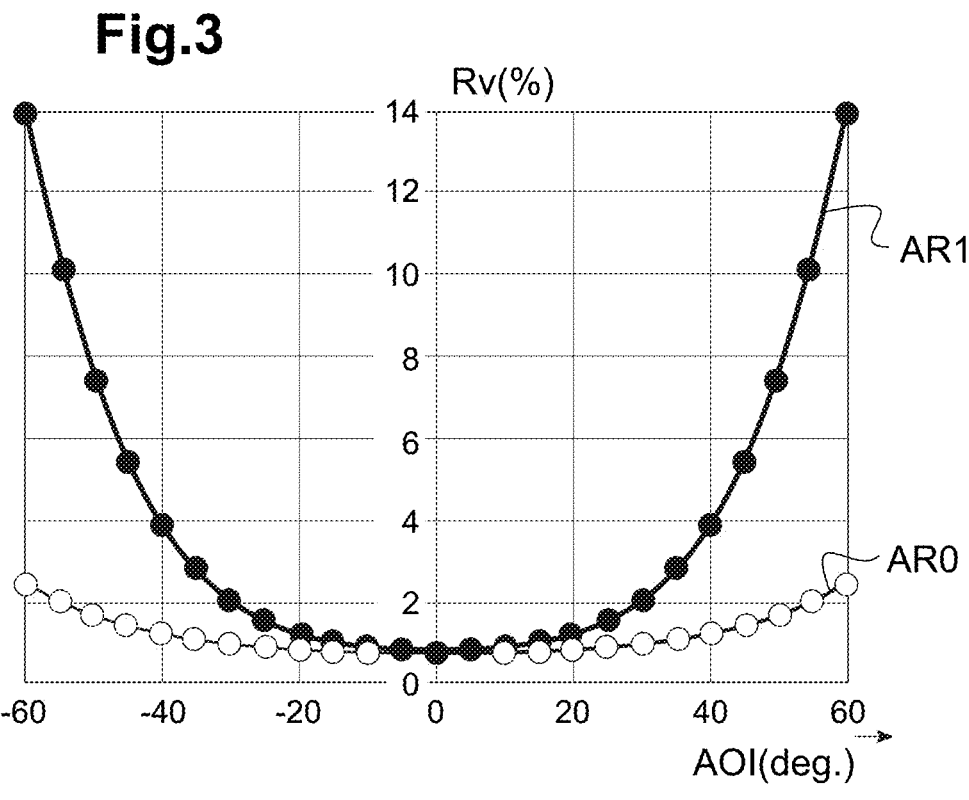
FIG. 3 shows a graph of the mean visible light reflection factor Rv as a function of the angle of incidence AOI for the interferential multilayer coating AR1 compared to a conventional anti-reflection coating AR0.

FIG. 3 shows a graph of the mean visible light reflection factor Rv as a function of the angle of incidence of the incoming light beams for the interferential multilayer coating AR1 compared to a conventional anti-reflection coating AR0 comprising, from the innermost to the outermost layer: a layer of zirconium dioxide (ZrO2) having a thickness of 27.3 nm, a layer of silicon dioxide (SiO2) having a thickness of 21.0 nm, a layer of zirconium dioxide (ZrO2) having a thickness of 83.1 nm, a layer of tin oxide (SnO2) having a thickness of 6.5 nm, and a layer of silicon dioxide (SiO2) having a thickness of 82.3 nm. The mean visible light reflection factor Rv is measured on prototypes using for example a reflectance spectrometer.

As evidenced in FIG. 3, the interferential multilayer coating AR1 has a mean visible light reflection factor Rv that is comparable to that of AR0 for 0 degree angle of incidence, that is for incoming light beams perpendicular to the first face. However, the mean visible light reflection factor Rv of the AR1 coating increases constantly as a function of the angle of incidence so that Rv is higher than or equal to 2.0% at an angle of incidence higher than or equal to 30 degrees and higher than or equal to 3.5% at an angle of incidence higher than or equal to 40 degrees. Nevertheless, the mean visible light reflection factor Rv of the first interferential multilayer coating AR1 remains lower than or equal 14.0% for the range of angle of incidence lower than or equal to 60 degrees.

Figure 4:
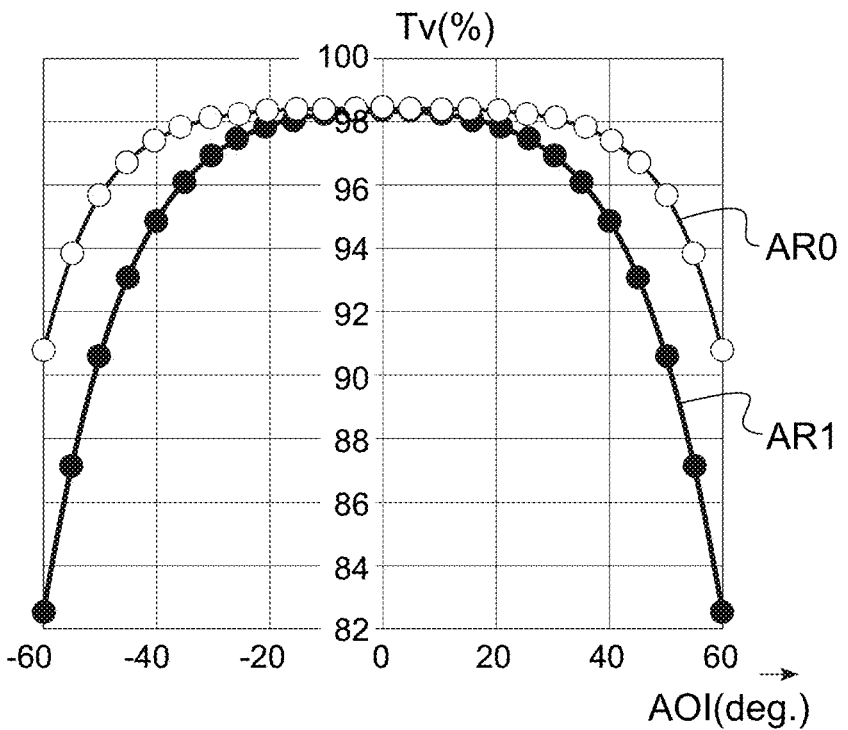
FIG. 4 shows a graph of the optical transmittance Tv as a function of the angle of incidence AOI for the first interferential multilayer coating AR1 compared to the conventional anti-reflection coating AR0.

FIG. 4 shows a graph of the optical transmittance Tv as a function of the angle of incidence for the interferential multilayer coating AR1 compared to the conventional anti-reflection coating AR0. In this example, the assumption is that there is no absorption in the optical article, neither with the conventional anti-reflection coating AR0 nor with the first interferential multilayer coating AR1. Thus, the mean transmittance Tv is almost equal to 100%–Rv. For incident optical beams at an angle of incidence of 0 degree, the conventional anti-reflection coating AR0 and the interferential multilayer coating AR1 have almost the same mean transmittance Tv that is higher than 98%. The conventional AR0 coating presents a visible light transmittance Tv that remains high as a function of the angle of incidence over the range from 0 to 60 degrees.

The mean visible light transmittance of the optical article with the conventional AR0 coating is:

$T_v$ is higher than 98% for angle of incidence comprised between 0 and 20 degrees, $T_v$ is about 98% at the angle of incidence of 30 degrees, $T_v$ is about 97.5% at the angle of incidence of 40 degrees, and $T_v$ is about 91% at the angle of incidence of 60 degrees.

In contrast, the mean visible light transmittance of the optical article with the interferential multilayer coating AR1 decreases more steeply as a function of the angle of incidence as follows:

$T_v$ is about 97.5% at the angle of incidence of 20 degrees, $T_v$ is about 97% at the angle of incidence of 30 degrees, $T_v$ is about 95% at the angle of incidence of 40 degrees, and $T_v$ is about 82.5% at the angle of incidence of 60 degrees.

Thus, the optical article with the first interferential multilayer coating AR1 appears to have a gradient transmission as a function of the angle of incidence of the optical beams incident on the interferential multilayer coating 13: the transmission factor $T_v$ is higher for low incidence angles and lower for high incidence angles. This gradient transmission effect appears even if the lens has no curvature. The gradient transmission effect is further increased if the lens has a curvature or if the lens frame has a curved shape, due to the rapid increase in angle of incidence when incident light beams hit lateral sides of the lens compared to the central part of the field of view around the null angle of incidence.

It is to be outlined that the optical article with the interferential multilayer coating according to the present disclosure presents the aspect of an anti-reflective coating, having a uniform thickness over the front face, which may be considered by some users as more aesthetic than graded tinted lenses.

Figure 9:
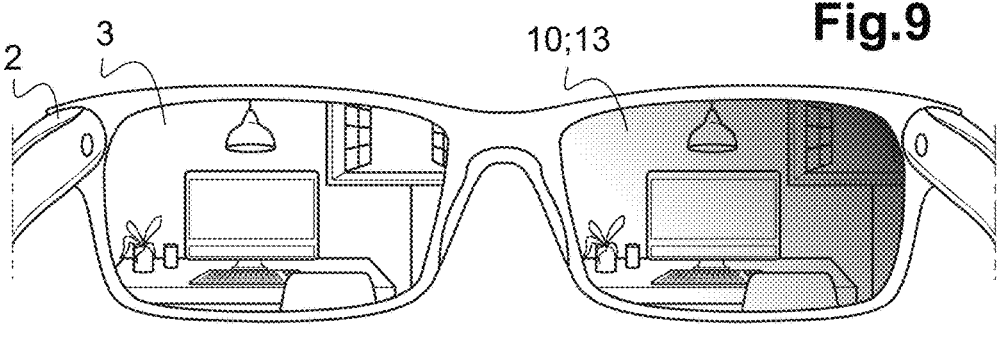
FIG. 9 shows a scene as seen through a pair of lenses from the viewer side, wherein the optical lens on the left side comprises no multilayer coating and the lens on the right side comprises an interferential multilayer coating according to the present disclosure.

Let us consider a user wearing a pair of lenses mounted in a frame as illustrated on FIG. 9, wherein the left lens has no antireflection coating or a conventional AR0 coating and the right lens comprises an interferential multilayer coating, for example AR1 according to the present disclosure. The user views the same scene through the left and right lenses. The scene comprises a computer screen arranged in a central part of the field of view, a pendant luminaire in the upper part of the field of view, a strong reflection of sunlight on a window on the right side of the scene and various elements in the background. As seen through the left lens, the whole field of view appears clear with bright points outside the computer screen. In particular, the high luminance parts of the field of view such as the computer screen, the pendant light and the sunlight reflection appear with a high brightness to the user's left eye. Indeed, the left lens having no antireflection coating or a conventional AR0 coating presents a mean visible light reflection factor Rv that is generally constant over the whole field of view and thus the visible light transmittance Tv is also constant over the whole field of view. The bright points outside the computer screen may induce visual fatigue.

In contrast, as seen on FIG. 9, the same scene seen through the right lens with the interferential multilayer coating AR1 appears bright only in the central area around the computer screen whereas the other areas such as the window, the pendant light, the ceiling, the right side, and the background appear much darker than seen through the left lens. Indeed, since the light beams incident on the right lens with an angle of incidence or apparent angle higher than 40 degrees are more reflected than the light beams incident on the right lens with lower angle of incidence, the visible light transmittance Tv of the light beams with a low angle of incidence is higher than the visible light transmittance Tv of the light beams with a low angle of incidence.

Thus, on FIG. 9, the right lens with the interferential multilayer coating AR1 presents a gradient transmission as a function of the angle of incidence of the optical beams incident on the interferential multilayer coating: the transmission is higher for low angles of incidence and lower for high angles of incidence. The viewer views the objects of the scene through the lens. Thus, the viewer sees objects appearing under a low apparent angle or apparent diameter about his direction of sight with a relatively higher transmittance and objects appearing at higher apparent angles or apparent diameter with a lower transmittance. This gradient transmission effect appears even if the lens has no curvature. The gradient transmission effect is further increased if the lens has a curvature or if the lens frame has a curved shape, due to the rapid increase in angle of incidence when incident light beams hit lateral sides of the lens compared to the central part of the field of view around the null angle of incidence. In other words, from the user's eye side, the lens with the multilayer interferential coating according to the present disclosure presents a central clear zone and a peripheral darker zone. However, from the outside, looking at the lens with the multilayer interferential coating from the scene towards the front side, this lens appears to have a uniform antireflection coating.

The exemplary interferential multilayer coating AR1, with high reflection at high angles of incidence, is suitable for using digital devices in an environment with a bright background, for instance using a laptop in front of a window, as illustrated on FIG. 9.

Figures 5, 6, 7, 8:
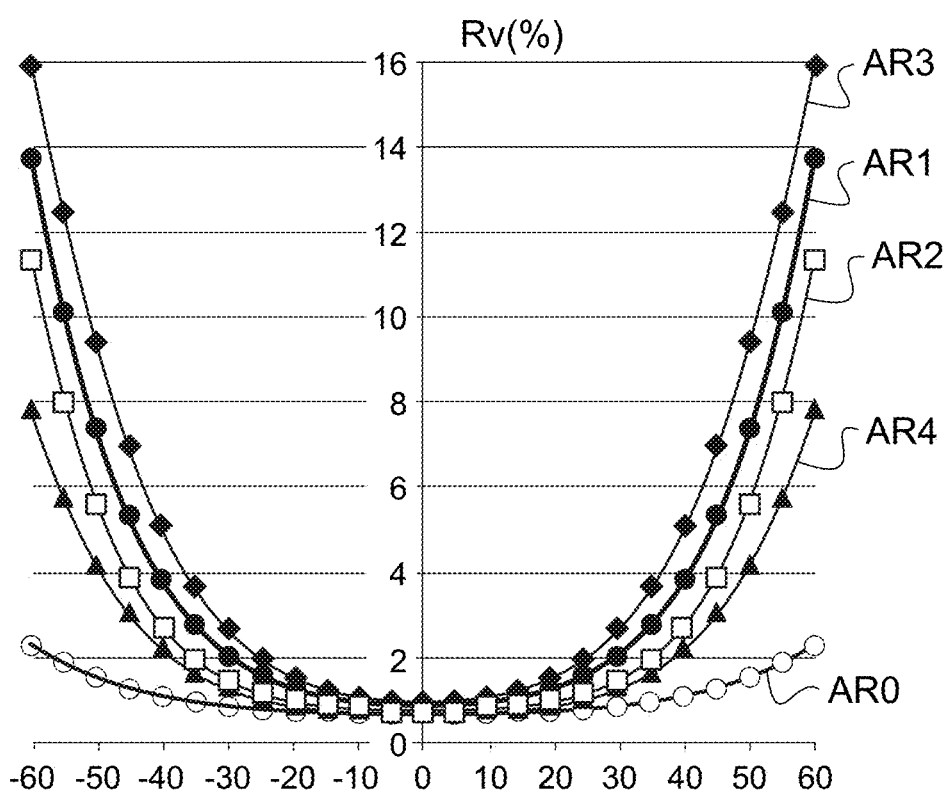
FIGS. 5, 6 and 7 are tables showing the structure and composition respectively of exemplary interferential multilayer coatings AR2, AR3 and AR4 in an optical article according to the present disclosure.
FIG. 8 shows a graph of the mean visible light reflection factor Rv as a function of the angle of incidence AOI for the interferential multilayer coatings AR1 to AR4, compared to the conventional anti-reflection coating AR0.

Depending on the screen size of the digital device, or on the viewing distance from digital device, different kinds of interferential multilayer coatings can be designed, with the mean visible light reflection factor Rv starting to rapidly increase at different angles of incidence (see FIG. 8). The corresponding layer structure and composition of exemplary interferential multilayer coatings AR2, AR3, and AR4 is shown in FIGS. 5 to 7.

FIG. 5 shows the structure of an exemplary interferential multilayer coating AR2 deposited on a hard coating, HC, on the front face 11 of an optical article 10. The interferential multilayer coating AR2 comprises a stack of five layers, from the innermost to the outermost layer: a layer of zirconium dioxide (ZrO2) having a thickness of 116.8 nm, a layer of silicon dioxide (SiO2) having a thickness of 144.7 nm, a layer of zirconium dioxide (ZrO2) having a thickness of 76.8 nm, a layer of tin oxide (SnO2) having a thickness of 6.5 nm, and a layer of silicon dioxide (SiO2) having a thickness of 70.1 nm.

FIG. 6 shows the structure of an exemplary interferential multilayer coating AR3 deposited on a hard coating, HC, on the front face 11 of an optical article 10. The interferential multilayer coating AR3 comprises a stack of six layers, from the innermost to the outermost layer: a layer of zirconium dioxide (ZrO2) having a thickness of 124.4 nm, a layer of silicon dioxide (SiO2) having a thickness of 341.2 nm, a layer of zirconium dioxide (ZrO2) having a thickness of 37.4 nm, a layer of silicon dioxide (SiO2) having a thickness of 19.3 nm, a layer of tin oxide (SnO2) having a thickness of 6.5 nm, and a layer of silicon dioxide (SiO2) having a thickness of 78.9 nm.

FIG. 7 shows the structure of an exemplary interferential multilayer coating AR4 deposited on a hard coating, HC, on the front face 11 of an optical article 10. The interferential multilayer coating AR4 comprises a stack of six layers, from the innermost to the outermost layer: a layer of zirconium dioxide (ZrO2) having a thickness of 16.6 nm, a layer of silicon dioxide (SiO2) having a thickness of 205.9 nm, a layer of zirconium dioxide (ZrO2) having a thickness of 109.8 nm, a layer of silicon dioxide (SiO2) having a thickness of 179.3 nm, a layer of zirconium dioxide (ZrO2) having a thickness of 117.0 nm, and a layer of silicon dioxide (SiO2) having a thickness of 84.0 nm.

Figure 10:
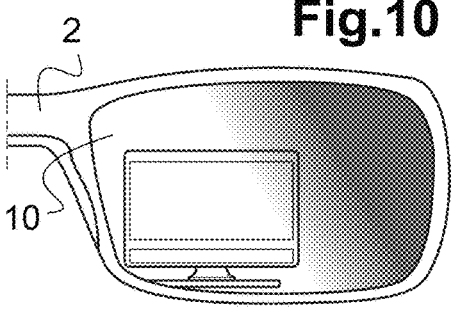
FIG. 10 shows an ophthalmic lens according to the present disclosure wherein the interferential multilayer coating is selected for viewing a screen having a small angular size relatively to the angular field of view through the lens frame.

The interferential multilayer coating AR3, with Rv rapidly increasing at a smaller angle of incidence than AR1, is suitable for a smaller screen, as illustrated on FIG. 10.

Figure 11:
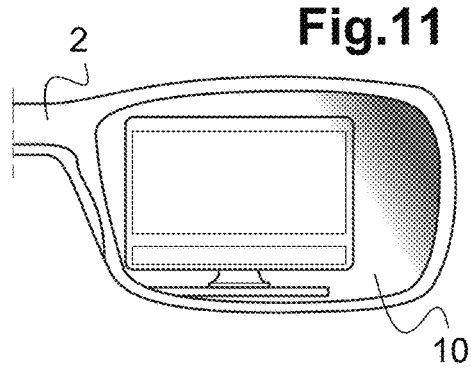
FIG. 11 shows an ophthalmic lens according to the present disclosure wherein the interferential multilayer coating is selected for viewing a screen having a large angular size relatively to the angular field of view through the lens frame.

For larger screen, as illustrated on FIG. 11, on the other hand, the interferential multilayer coating AR2 or AR4, with Rv rapidly increasing at a higher angle of incidence than AR1, is more preferred.

The interferential multilayer coating can be selected depending on the user preferences, the screen size, working distance as illustrated above. Furthermore, the interferential multilayer coating can be selected depending on the user sensitivity to the background luminance or depending on the luminance contrast between the digital screen and the background or depending on a preferred luminance range of the user.

Figure 12:
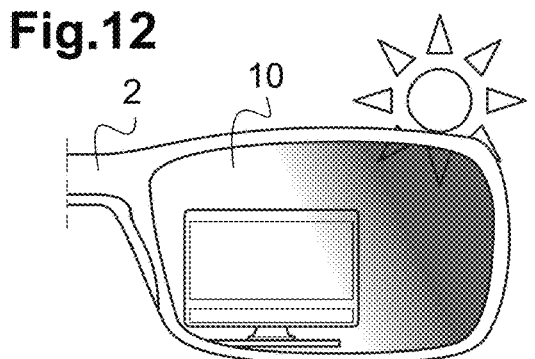
FIG. 12 shows an ophthalmic lens according to the present disclosure wherein the interferential multilayer coating is selected for viewing a screen in background with a higher luminance.

As illustrated in FIG. 12, in an environment with a high luminance background or with a high ratio of luminance between the digital screen and the background, the interferential multilayer coating AR3, with Rv rapidly increasing at a smaller angle of incidence is preferred.

Figure 13:
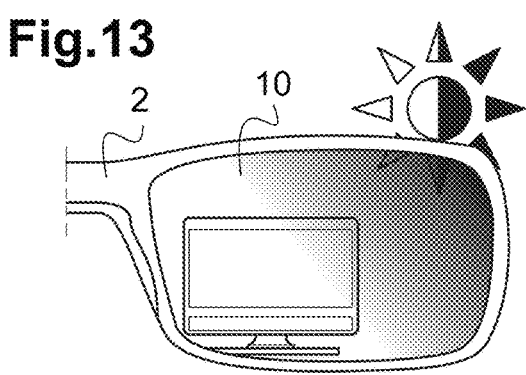
FIG. 13 shows an ophthalmic lens according to the present disclosure wherein the interferential multilayer coating is selected for viewing a screen in background with a lower luminance.

As illustrated in FIG. 13, in an environment with a lower luminance background or with a lower ratio of luminance between the digital screen and the background, the interferential multilayer coating AR4, with Rv slowly increasing at a larger angle of incidence is preferred.

Figure 14:
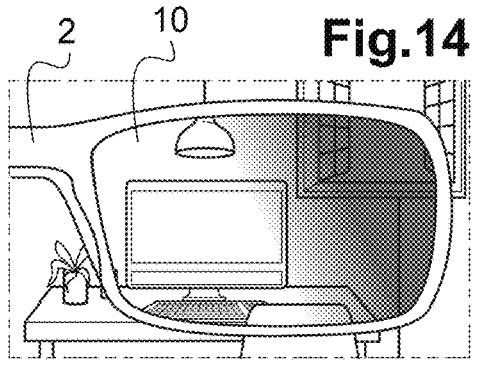
FIG. 14 shows an ophthalmic lens according to the present disclosure wherein the interferential multilayer coating is selected for viewing a screen at a longer working distance.

For a screen placed at a longer working distance, as illustrated in FIG. 14, the interferential multilayer coating AR1 or AR3, with Rv rapidly increasing at a lower angle of incidence than AR2, is more preferred.

Figure 15:
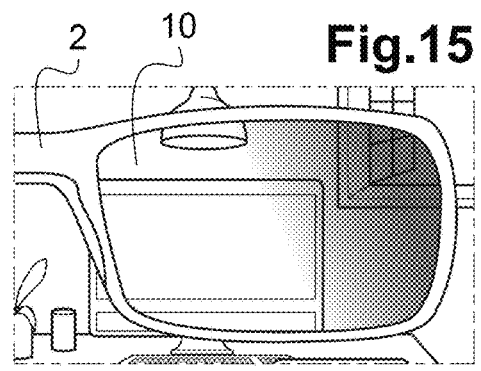
FIG. 15 shows an ophthalmic lens according to the present disclosure wherein the interferential multilayer coating is selected for viewing a screen at a shorter working distance.

For a screen placed at a shorter working distance, as illustrated in FIG. 15, the interferential multilayer coating AR2 or AR4, with Rv slowly increasing at a higher angle of incidence than AR1, is more preferred.

The interferential multilayer coating may also be personalized depending on the behavior of the user among head mover and eye mover type. A head mover user rather benefits from a smaller clear zone, such as the AR3 or AR1 interferential multilayer coating, because he scans the visual space with his head together with the glasses. An eye mover user rather benefits from a larger clear zone, such as the AR4 or AR2 interferential multilayer coating, because he moves his eyes behind the stationary glasses.

To evaluate the merit of the interferential multilayer coating according to the present disclosure, a proof of principle study was conducted. In the laboratory settings, a light box is constructed for simulating severe glare conditions, i.e., bright light around the digital screen. The Critical Flicker Fusion Frequency (CFFF) is chosen to evaluate visual fatigue. We demonstrate that with no lenses the CFFF decreases after 10 minutes of reading under the glare conditions. This trend is very consistent across the participants. This trend is abolished with the lenses presenting a gradient transmission as disclosed in the present application. The effect is statistically significant.

In addition, we have also run a smaller-scale proof of principle experiment on a subset of subjects in real life glaring conditions represented by 10 minutes of reading a laptop screen against the sky on a bright sunny day. We replicated the in-lab results by showing a decreased CFFF after the task without glasses and no decrease with the lenses presenting a gradient transmission as disclosed in the present application.

Process

The multilayer interferential coating is made by known methods of thin film deposition. The thickness of each layer is uniform over the surface of the optical article. Advantageously, the multilayer interferential coating is uniform across the front face 11 of the optical article 10.

The layers of the interference stack, for example with a view to producing a gradient transmission optical article, may be deposited by any known means such as by evaporation, optionally assisted by ion beams, by ion beam sputtering, by cathode sputtering, or by plasma enhanced chemical vapor deposition or by evaporation in a vacuum chamber.

The layers of the interference stack may also be deposited by high-pressure cathode sputtering.

The interference stack may be deposited on a bare substrate, i.e. wherein the front face is uncoated, or on an already coated substrate, i.e. the front face being coated with one or more functional coatings, such as a hard coating.

The invention claimed is:

1. Optical article comprising a front face adapted to receive incident optical beams and a back face through which transmitted optical beams exit to reach an eye of an individual, wherein the front face comprises an interferential multilayer coating comprising a stack of dielectric layers, the interferential multilayer coating providing the optical article with a mean visible light reflection factor $R_v$ that is a function of an angle of incidence of each optical beam on the front face, said optical article being designed such that said optical article has a higher mean visible light transmittance for low incidence angles and a lower mean visible light transmittance for high incidence angles:

the mean visible light reflection factor $R_v$ being lower than or equal to 2.0% for incident optical beams on the front face over a first range of angle of incidence with respect to a perpendicular to said front face higher than or equal to 0 degrees and lower than or equal to 20 degrees, and the mean visible light reflection factor being higher than or equal to 2.0% for incident optical beams on the front face over a second range of angle of incidence with respect to the perpendicular to said front face higher than or equal to 40 degrees and lower than or equal to 60 degrees.

2. Optical article according to claim 1 wherein the mean visible light reflection factor is lower than or equal to 8.0% for incident optical beams on the front face over said second range of angle of incidence with respect to the perpendicular to said front face higher than or equal to 40 degrees and lower than or equal to 60 degrees.

3. Optical article according to claim 1 wherein the mean visible light reflection factor is higher than or equal to 2.5% and lower than or equal to 11.5% for incident optical beams on the front face over said second range of angle of incidence with respect to the perpendicular to said front face higher than or equal to 40 degrees and lower than or equal to 60 degrees.

4. Optical article according to claim 1 wherein the mean visible light reflection factor is higher than or equal to 3.5% and lower than or equal to 14.0% for incident optical beams on the front face over said second range of angle of incidence with respect to the perpendicular to said front face higher than or equal to 40 degrees and lower than or equal to 60 degrees.

5. Optical article according to claim 1 wherein the mean visible light reflection factor is higher than or equal to 4.5% and lower than or equal to 16.0% for incident optical beams on the front face over said second range of angle of incidence with respect to the perpendicular to said front face higher than or equal to 40 degrees and lower than or equal to 60 degrees.

6. Optical article according to claim 1, wherein a ratio between $R_v min(40°)$ and $R_v(0°)$ is higher than 3, wherein $R_v min(40°)$ is the minimum $R_2$ value at an angle of incidence with respect to the perpendicular to said front face that is equal to 40 degrees and $R_v(0°)$ is the $R_v$ value at an angle of incidence perpendicular to said front face.

7. Optical article according to claim 1, wherein the interferential multilayer coating comprises at least one layer of high refractive index material having a refractive index higher than 1.55 and at least one layer of low refractive index material having a refractive index of 1.55 or less.

8. Optical article according to claim 7, wherein said high refractive index material is selected among $ZrO_2$, $SnO_2$, SiN, $TiO_2$, $PrTiO_3$, $LaTiO_3$, $Ta_2O_5$, $Y_2O_3$, $Ce_2O_3$, $La_2O_3$, $Dy_2O_5$, $Nb_2O_5$, $HfO_2$, $Sc_2O_3$, $Pr_2O_3$, $Al_2O_3$, or $Si_3N_4$ and said low refractive index material is selected among $SiO_2$, $MgF_2$, $ZrF_4$, $Al_2O_3$, $AlF_3$, chiolite $Na_3[Al_3F_{14}]$, cryolite $Na_3[AlF_6]$, or any mixture thereof.

9. An optical article according to claim 8, wherein said interferential multilayer coating comprises layers of different materials from an innermost layer to an outermost layer:
    a layer of zirconium dioxide having a thickness of 15-130 nm;
    a layer of silicon dioxide having a thickness of 130-300 nm;
    a layer of zirconium dioxide having a thickness of 30-130 nm;
    a layer of tin oxide having a thickness of 5-30 nm;
    an outermost layer comprising a layer of silicon dioxide having a thickness of 5-130 nm.

10. Optical article according to claim 1, further comprising a hard coating, the interferential multilayer coating being arranged on said hard coating.

11. Ophthalmic lens comprising an optical article according to claim 1.

12. Ophthalmic equipment comprising a frame and at least one ophthalmic lens according to claim 11, mounted on the frame.

13. Ophthalmic equipment comprising a frame and two ophthalmic lenses according to claim 11, mounted on the frame.

14. Optical article according to claim 2, wherein a ratio between $R_v$min(40°) and $R_v(0°)$ is higher than 3, wherein $R_v$min(40°) is the minimum $R_2$ value at an angle of incidence with respect to the perpendicular to said front face that is equal to 40 degrees and $R_v(0°)$ is the $R_v$ value at an angle of incidence perpendicular to said front face.

15. Optical article according to claim 3, wherein a ratio between $R_v$min(40°) and $R_y(0°)$ is higher than 3, wherein $R_v$min(40°) is the minimum $R_2$ value at an angle of incidence with respect to the perpendicular to said front face that is equal to 40 degrees and $R_v(0°)$ is the $R_v$ value at an angle of incidence perpendicular to said front face.

16. Optical article according to claim 4, wherein a ratio between $R_v$min(40°) and $R_y(0°)$ is higher than 3, wherein $R_v$min(40°) is the minimum $R_v$ value at an angle of incidence with respect to the perpendicular to said front face that is equal to 40 degrees and $R_v(0°)$ is the $R_v$ value at an angle of incidence perpendicular to said front face.

17. Optical article according to claim 5, wherein a ratio between $R_v$min(40°) and $R_y(0°)$ is higher than 3, wherein $R_v$min(40°) is the minimum $R_2$ value at an angle of incidence with respect to the perpendicular to said front face that is equal to 40 degrees and $R_v(0°)$ is the $R_v$ value at an angle of incidence perpendicular to said front face.

18. Optical article according to claim 1, wherein a ratio between $R_v$min(40°) and $R_y(0°)$ is higher than 4, wherein $R_v$min(40°) is the minimum $R_2$ value at an angle of incidence with respect to the perpendicular to said front face that is equal to 40 degrees and $R_v(0°)$ is the $R_v$ value at an angle of incidence perpendicular to said front face.

19. Optical article according to claim 1, wherein a ratio between $R_v$min(40°) and $R_v(0°)$ is higher than 5, wherein $R_v$min(40°) is the minimum $R_2$ value at an angle of incidence with respect to the perpendicular to said front face that is equal to 40 degrees and $R_v(0°)$ is the $R_v$ value at an angle of incidence perpendicular to said front face.

20. Optical article according to claim 7, wherein said high refractive index material is selected among $ZrO_2$, $SnO_2$, SiN, $TiO_2$, $PrTiO_3$, $LaTiO_3$, $Ta_2O_5$, $Y_2O_3$, $Ce_2O_3$, $La_2O_3$, $Dy_2O_5$, $Nb_2O_5$, $HfO_2$, $Sc_2O_3$, $Pr_2O_3$, $Al_2O_3$, or $Si_3N_4$ and said low refractive index material is $SiO_2$ or $SiO_2$ doped with $Al_2O_3$ with from 1 to 10% by weight of $Al_2O_3$ relative to a total weight of $SiO_2$ and $Al_2O_3$ in said low refractive index material layer.

* * * * *